July 17, 1923.
W. F. SCHALLER
1,462,468
TRAY TURNING MACHINE
Filed March 13, 1920
2 Sheets-Sheet 1
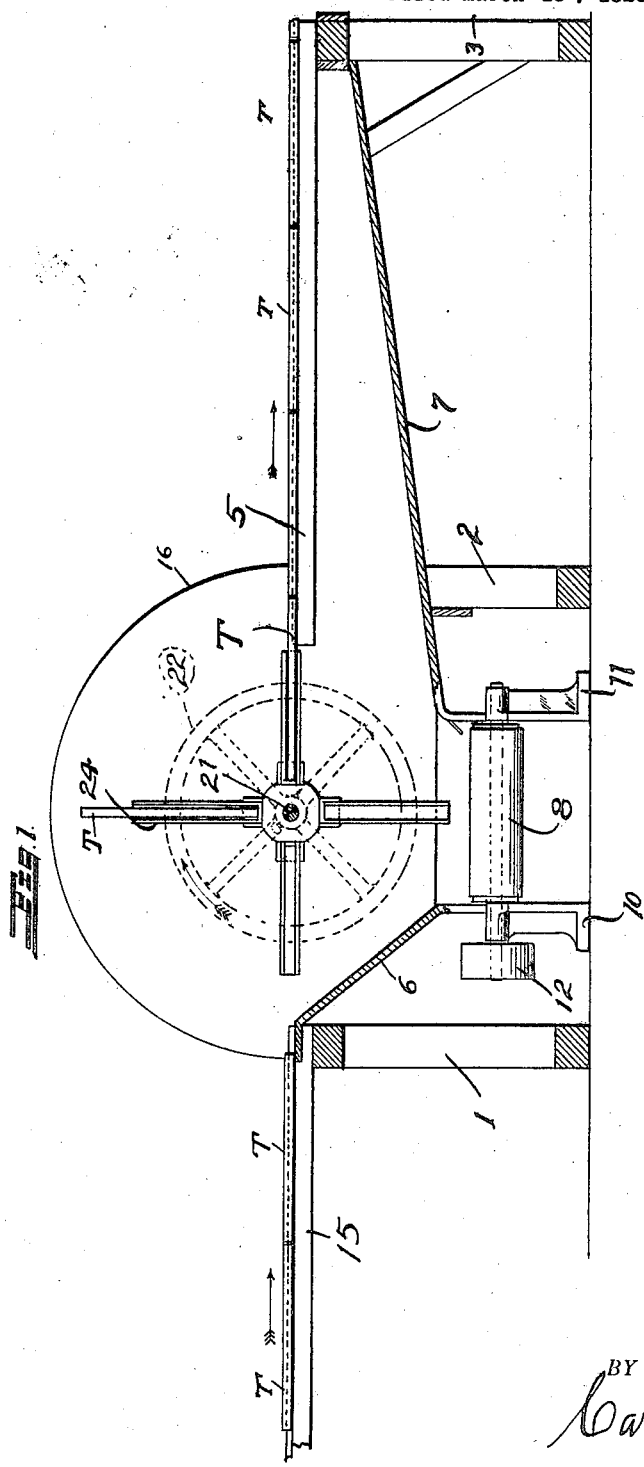
INVENTOR.
W. F. Schaller.
BY
Carlos P. Griffin
ATTORNEY

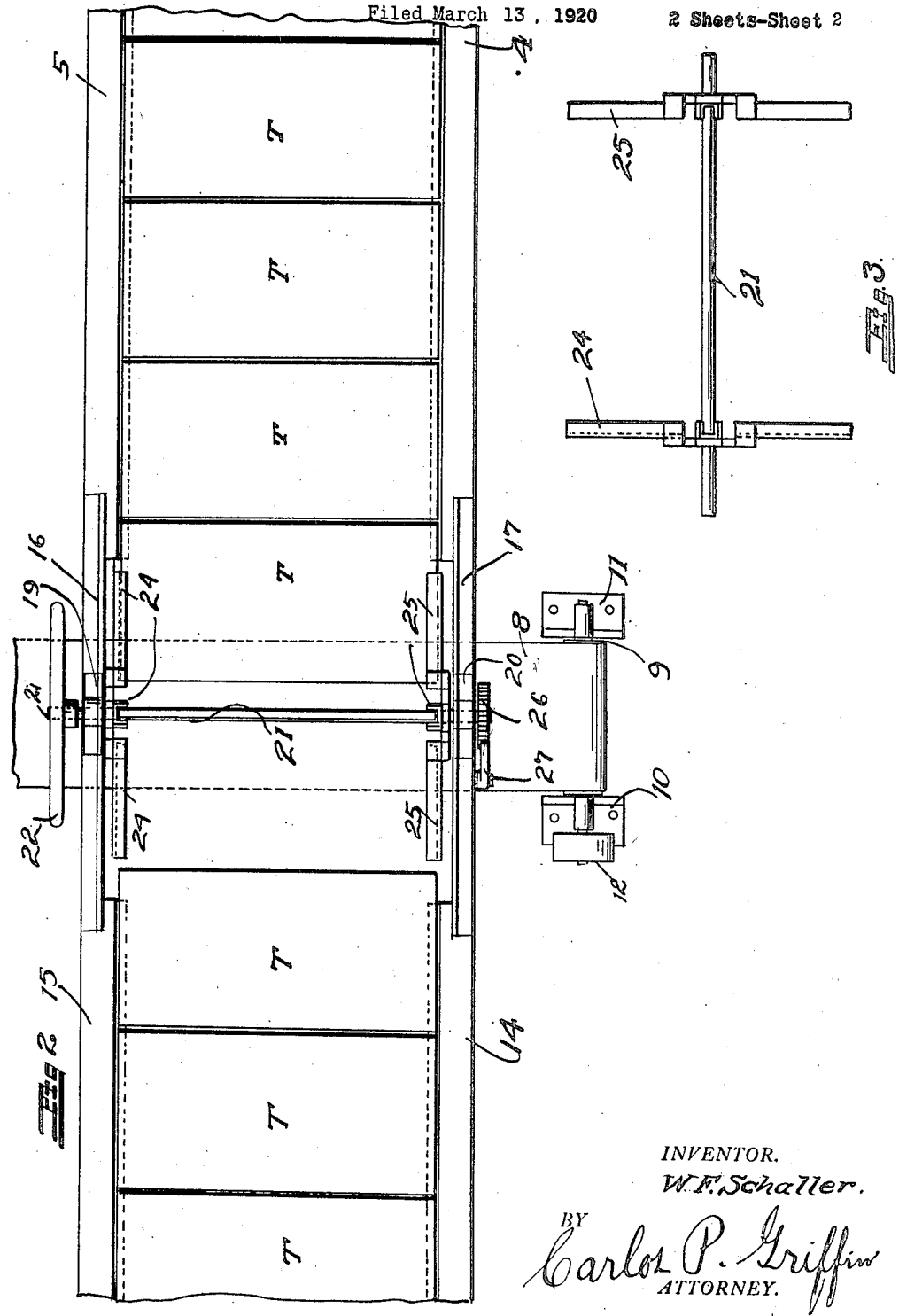

Patented July 17, 1923.

1,462,468

UNITED STATES PATENT OFFICE.

WILLIAM F. SCHALLER, OF SAN FRANCISCO, CALIFORNIA, ASSIGNOR OF FIVE-TENTHS TO ELIZABETH SCHALLER, THREE-TENTHS TO ALICE ELEANOR SCHALLER, AND TWO-TENTHS TO CHAS. A. SHOENEMAN, ALL OF SAN FRANCISCO, CALIFORNIA.

TRAY-TURNING MACHINE.

Application filed March 13, 1920. Serial No. 365,385.

*To all whom it may concern:*

Be it known that I, WILLIAM F. SCHALLER, a citizen of the United States, residing at 948 Market Street, San Francisco, in the county of San Francisco, State of California, have invented a new and useful Tray-Turning Machine, of which the following is a specification in such full and clear terms as will enable those skilled in the art to construct and use the same.

This invention relates to a tray turning machine, the object of which is to remove the dried fruit therefrom and to collect the same in suitable receptacles.

It will be understood by those skilled in the art that for drying the fruit, the fruit is first cut or in some way treated when put upon the trays, after which it is exposed to drying either in the sun or special apparatus and during the course of the drying, the fruit often sticks to the trays from one cause or another, thus necessitating the jarring or tapping of the trays to shake the adherent fruit loose.

In the present invention a holder is provided which turns the trays over and which holder places them on a convenient rack for removal, with the top side on the bottom, so that the fruit adhering may be easily knocked off into a suitable bin by tapping the trays.

Other objects of the invention will appear as the description proceeds.

An embodiment of the invention is shown in the accompanying drawings in which the same reference numeral is applied to the same portion throughout but I am aware that there may be modifications thereof.

Figure 1, is a vertical sectional view of the machine.

Fig. 2, is a plan view of the machine showing the belt for carrying the dried materials to a suitable place of storage.

Fig. 3, is a side elevation of the tray turning wheel.

The machine comprises three separately operated frames 1 to 3 inclusive, which frames are connected by the side rails 4 and 5. Between the operated frames 1 to 3 inclusive is a hopper having inclined bottom members 6 and 7; between the lower ends of the bottom 6 and 7 there is a longitudinally extending endless belt 8 which passes over a drum 9, revoluble in two journaled bearings 10 and 11 and driven by means of a suitable pulley 12. Extending to the left of the upright frames are two receiving rails 14 and 15. Between the rails 15 and 5 and 14 and 4 are two one-half circular shields 16 and 17, which are for the purpose of preventing the fruit from falling off the ends of the trays. These shields extend down to the lower portion of the hopper bottom 6 and 7.

Journaled in suitable bearings 19 and 20 at the center of the bottom of the semicircular shields there is a shaft 21 which has a hand wheel 22 to rotate it, and said shaft carries eight channeled spokes 24 and 25, the channels facing each other in pairs. The shaft 21 is also provided with a ratchet wheel 26 which is engaged by the pawl 27 to prevent the wheel from rotating in one direction. In operation the trays T are placed upon rails 14 and 15 and pushed towards the frame 1, with their load of dried material. The operator thereupon pushes them into the channeled spokes 24 and 25 of the tray turning apparatus, and when the wheel 22 turns the trays as illustrated in Fig. 1, the fruit falls off the lower edge of the tray onto the belt 8.

The trays are turned as rapidly as is convenient and when the tray assumes the position shown in the right hand portion of the turning apparatus Fig. 1, another workman removes the tray from the turning apparatus and pushes the series of trays to the right, along the rails 4 and 5, and if any material adheres to the trays, he jars it off by tapping the trays with a light stick, whereupon it falls into the hopper bottom 7 and shakes from there down onto the belt 8 to be discharged into suitable storage bins.

What I claim is as follows, but various modifications may be made in the construction shown in the drawings and above particularly described form, within the purview of my invention.

1. A tray turning machine comprising the combination of a frame, a pair of supporting rails on said frame, a shaft revoluble in bearings on said frame, channeled spokes in pairs and facing each other on said shaft and a wheel for turning said shaft.

2. A tray turning machine comprising the combination of a frame, a pair of rails adapted to receive a number of trays, a shaft revoluble in said frame, channeled spokes on said shaft adapted to receive said trays from said rails, means for turning said shaft whereby each tray is turned completely over, and rails for receiving said turned trays.

In testimony whereof I have hereunto set my hand this 4th day of March, A. D. 1920.

WILLIAM F. SCHALLER.